United States Patent [19]

ter Horst et al.

[11] Patent Number: 4,938,649

[45] Date of Patent: Jul. 3, 1990

[54] METHOD AND DEVICE FOR HANDLING ENDS FOR TINS

[75] Inventors: Gerrit H. ter Horst, Schalkhaar; Hendrik C. Vrind; Johannus C. Kempers, both of Deventer, all of Netherlands

[73] Assignee: Thomassen & Drijver-Verblifa N.V., Netherlands

[21] Appl. No.: 783,936

[22] PCT Filed: Jan. 31, 1985

[86] PCT No.: PCT/NL85/00006

§ 371 Date: Sep. 26, 1985

§ 102(e) Date: Sep. 26, 1985

[87] PCT Pub. No.: WO85/03497

PCT Pub. Date: Aug. 15, 1985

[30] Foreign Application Priority Data

Jan. 31, 1984 [NL] Netherlands .......................... 8400294

[51] Int. Cl.$^5$ .............................................. B65G 59/00
[52] U.S. Cl. ...................................... 414/412; 414/786;
414/798.2; 414/798.9; 414/753; 414/226;
198/468.2; 198/433; 198/462; 198/607;
198/415; 198/626.1; 53/542; 53/316; 83/924
[58] Field of Search ............... 198/626, 627, 604, 605,
198/607, 433, 457, 461, 462, 468.11, 419.1,
468.1, 468.2; 414/412, 786, 751, 798.9, 753,
798.2, 225; 83/924

[56] References Cited

U.S. PATENT DOCUMENTS

| 3,071,236 | 1/1963 | Hahn et al. ................. 198/462 X |
| 3,350,842 | 11/1967 | Renish ............................ 53/316 |
| 3,395,784 | 8/1968 | Kanarek ..................... 198/626 X |
| 3,435,584 | 4/1969 | Prechter ........................ 53/542 X |
| 3,487,965 | 1/1970 | Gale ............................ 414/412 X |
| 3,533,496 | 10/1970 | Atwood ........................... 198/457 |
| 3,538,992 | 11/1970 | Chauhan ....................... 53/542 X |
| 3,971,189 | 7/1976 | Mojden et al. ................ 53/542 X |
| 4,066,218 | 1/1978 | Kamp ...................... 414/798.9 X |
| 4,164,996 | 8/1979 | Tomlinson ...................... 198/415 |
| 4,184,799 | 1/1980 | Arndt ......................... 414/751 X |
| 4,219,112 | 8/1980 | Loewenthal ..................... 198/433 |
| 4,364,466 | 12/1982 | Mojden ........................ 414/798.9 |
| 4,364,467 | 12/1982 | Blakelock .................. 198/468.2 X |
| 4,390,135 | 6/1983 | Wakamatsu et al. ........... 241/101.2 |
| 4,457,422 | 7/1984 | Hurd ......................... 198/607 X |

FOREIGN PATENT DOCUMENTS

2010771 7/1979 United Kingdom ................. 414/412

Primary Examiner—Frank E. Werner
Attorney, Agent, or Firm—Watson, Cole, Grindle & Watson

[57] ABSTRACT

Apparatus and method in which stacks of tin ends are formed and fed longitudinally to a three-endless belt conveyor in spaced relation of stacks with turns in the feed paths after the first conveyor being defined by overlapping separate three-endless belt conveyor assemblies. The stacks of tin ends may be unwrapped or they may be wrapped, in which latter case, an unwrapping station is provided at which the wrapping is both cut and the wrapping peeled away in response to rotation of the stack. The unwrapped stacks in any case are fed into a continuous stream to a closing station where the individual tin ends are applied to can bodies. In one unwrapping embodiment, the stacks are fed to a first conveyor through the intermediary of a pestle and gripper which are fed in unison to travel a stack to the first conveyor and provision is also made to relax the grip of the pestle and gripper while the wrapper is peeled away.

33 Claims, 8 Drawing Sheets

METHOD AND DEVICE FOR HANDLING ENDS FOR TINS

The invention relates to a method of handling round flat substantially identical ends for tins wherein the ends are provided in the form of a plurality of elongated stacks of ends, each stack comprising a plurality of separate ends in abutting relationship and surrounded by a sheet of material such as paper.

When, in particular in the supply of the ends to the transport member, a gap is formed between the transported ends, they may fall over due to lack of support by preceding or following ends. This involves a disturbance in the transport of the ends.

The invention has for its object to carry out the method in a manner such that the risk of disturbances is reduced. For this purpose the invention provides the method and the device described in claims 1 and 2 respectively. The device embodying the invention preferably has one or more characteristics defined in the further claims in order to provide a particularly effective device for feeding a closing machine without interruption and with the required supply rate, in which machine the tins are provided with ends.

In general the invention provides a device combining a high transport rate with high reliability i.e. a very low sensitivity to disturbance.

To give a concrete idea reference is made to a known device for transporting ends serving to close preservation tins. It is capable of transporting at the most about 500 ends a minute. In practice it is found that this device is not sufficiently reliable so that constant supervision by the staff is necessary in order to avoid stagnation in the production.

The device according to the invention is capable of transporting about 1000 ends a minute with a considerably improved reliability.

The invention will now be described more fully with reference to the accompanying drawings showing a few embodiments. The drawings show in.

Figure 1:
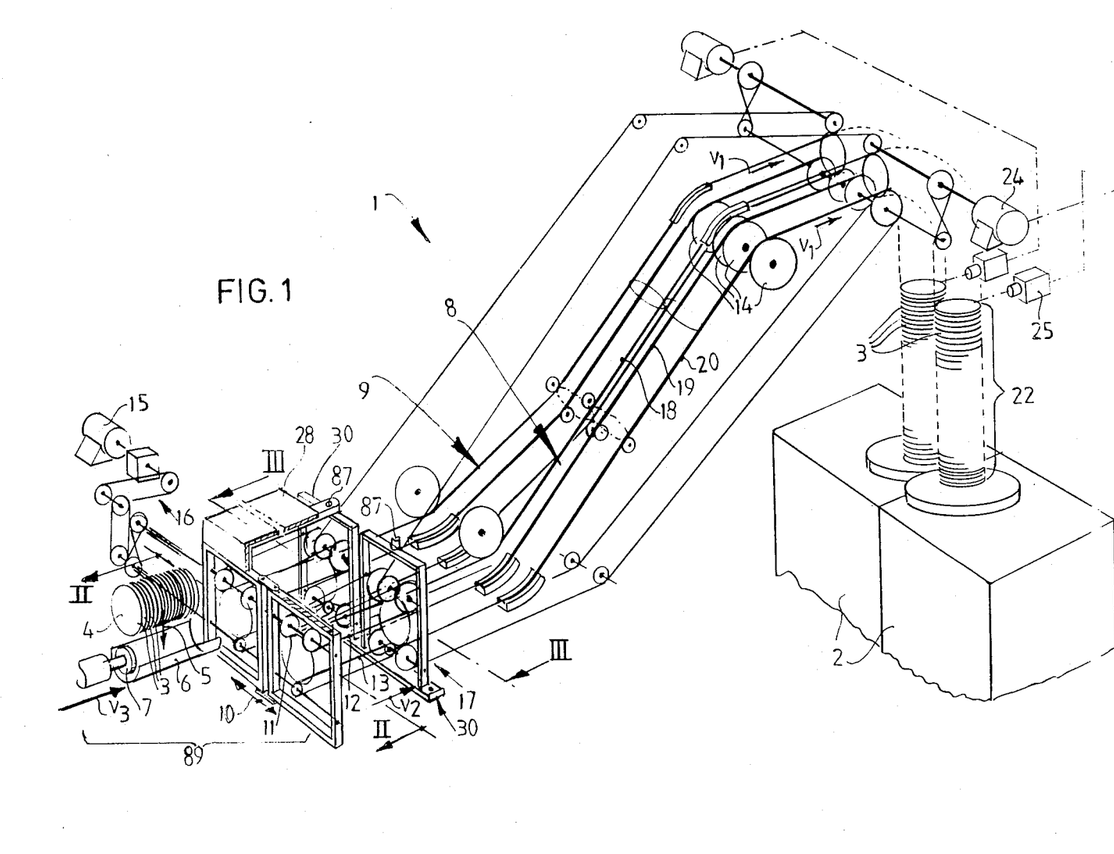
FIG. 1 a drastically simplified, schematic perspective view of a complex machine comprising a device embodying the invention, FIG. 2 a sectional view II—II in FIG. 1, FIG. 3 a sectional view III—III in FIG. 1, FIG. 4 a perspective view of a further embodiment of a combined machine in accordance with the invention, FIG. 5 a further detailed, fragmentary, perspective view of detail V of FIG. 4 on an enlarged scale, FIG. 6 a schematic plan view of the detail of FIG. 5, FIG. 7 a cross-sectional view VII—VII of FIG. 5, FIG. 8 a cross-sectional view VIII—VIII in FIG. 5, FIG. 9 on an enlarged scale detail IX of FIG. 1, FIG. 10 a cross-sectional view of a stack supply device of a further device embodying the invention, FIG. 11 on an enlarged scale the stack unpacking device of FIG. 10, FIGS. 12 to 14 and 16 to 19 fragmentary longitudinal views of a stack supply device to be arranged at the inlet end of the transport device embodying the invention in consecutive operational positions, FIG. 15 a cross-sectional view of the stack unpacking device of FIG. 10 to be arranged at the input end of the transport device embodying the invention, FIGS. 20 and 21 schematic views of the inlet end of the transport device of FIG. 1 embodying the invention in two different positions, FIG. 22 a fragmentary side elevation of an inlet end of a further transport device embodying the invention, with which the stack supply device of FIGS. 10 to 19 can be connected, FIGS. 23 and 24 schematic sectional views taken on the lines XXIII—XXIII and XIV—XIV respectively in FIG. 22 and FIG. 25 a preferred variant of the sectional view of FIG. 23 on an enlarged scale.

FIG. 1 shows a combined machine 1 for introducing stacks 4 of ends 3 to the closing devices 2, which comprise means for shutting tins by a supplied end 3.

Figure 2:
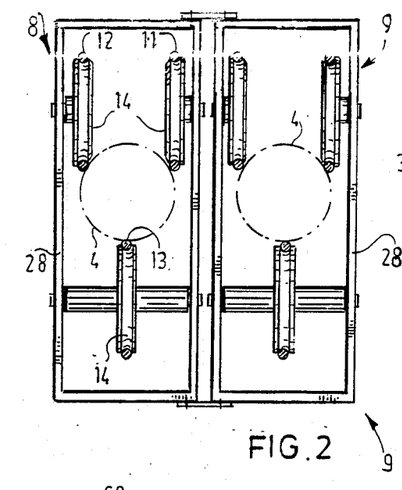
Figures 20, 21:
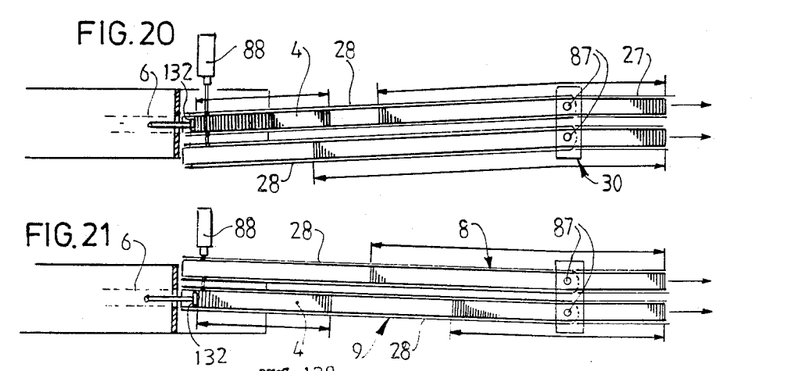

The stacks 4 of ends 3 are successively supplied in a stack supply device 89 in the direction of the arrow 5 by means not shown in FIG. 1 to a guide chute 6 to which is adjoined a reciprocatory pestle 7 for supplying a stack 4 of ends 3 alternatively to transport devices 8 and 9 according to the invention. For this alternating supply the inlet ends of the transport devices 8, 9 are coupled and movable in the direction of the arrow 10 so that alternately the inlet end of the device 8 and that of the device 9 are located in line with the guide chute 6, which is illustrated in FIGS. 2, 20 and 21.

A stationary frame 30 carries two brackets 28 pivoted thereto with the aid of shafts 87 for the devices 8 and 9 respectively. These brackets 28 and 29 are pivotable, as shown in FIGS. 20 and 21, by means of a hydraulic ram 88 between two positions in which the devices 8 and 9 respectively adjoin the guide chute 6. Thus a stack 4 of ends 3 is alternately supplied to the devices 8 and 9. The brackets 28 carry rollers designated by 14, about which endless ropes 11, 12, 13 are passing. A stack 4 of ends 3 is indicated by a broken circle.

The devices 8 and 9 have similar structures. Therefore, only the device 8 will be further described.

Figure 3:
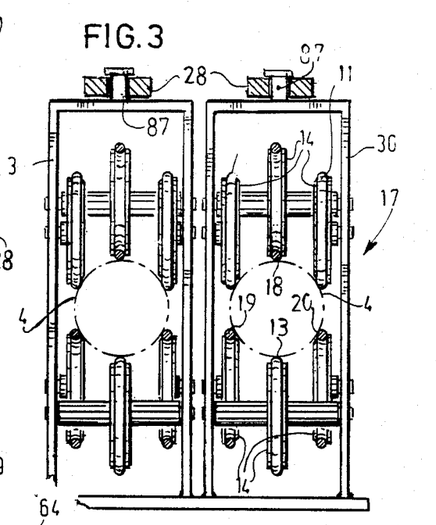
Figure 9:
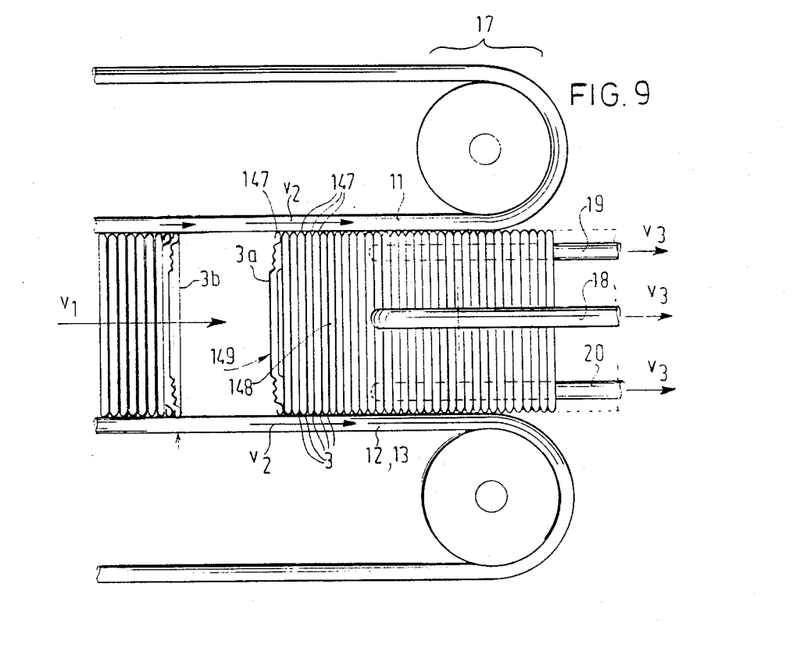

This device 8 comprises a transport member having the three endless ropes 11, 12, 13. A motor 15 with a transmission 16 serves to drive the ropes 11, 12, 13 with equal speeds $v_2$. The operative parts of the two lower ropes 11, 12 and the upper rope 13 are parallel and are spaced apart by distances such that these operative parts together are capable of retaining the end 3 to be transported by clamping and of transporting them. The ropes 11, 12, 13 are adjoined through a transition zone 17 three further endless ropes 18, 19, 20. As shown in FIG. 3 the frame 30 carries at the transition zone 17 the rollers 14, about which are passed the endless ropes 11, 12, 13 and the ropes 18, 19, 20. A motor 24 serves to drive the ropes 18, 19, 20 with a speed $v_1$, which is about half the speed $v_2$ of the ropes 11, 12, 13. In order to ensure that the magazine 22 always contains the same stock of ends 3, a monitoring member 25 is coupled through a connection indicated by a dot-and-dash line to the motor 24 for control. The speed $v_1$ of the ropes 18, 19, 20 is a variable speed determined by the working rate of the closing device 2 and may be 5 ms a minute. If the speed $v_2$ of the ropes 11, 12, 13 is equal to 10 ms/sec, the stacks 4 of ends 3 are axially introduced in the ropes 11, 12, 13 at a rate of, for example, 15 ms/sec, at least a higher rate $v_3$ than the speed $v_2$ of the ropes 11, 12, 13, because stepwise introduced stacks 4 are brought into contact with the end 149 of a continuous stack of ends 148 (FIG. 9). The rearmost end $3a$ of the continuous stack 148 is held safely and stably in its adjoining position because the ropes 11, 12, 13 exert a propelling effect at three places of the circumference of the end $3a$ in the direction of the speed $v_2$, since the speed of said end $3a$ is equal to the lower speed $v_1$. It is ensured that a next stack 4 of ends 3 is brought into contact with the end 149 of the continuous stack 148 before this end 149 has reached the transition zone 17 to a next set of ropes 18, 19, 20.

During the introduction of a stack 4 the foremost cover 3b is exposed along its circumference to a braking force exerted by the ropes 11, 12, 13 and pushing this end 3b towards the stack 4 so that the end 3b cannot fall off.

Figure 4:
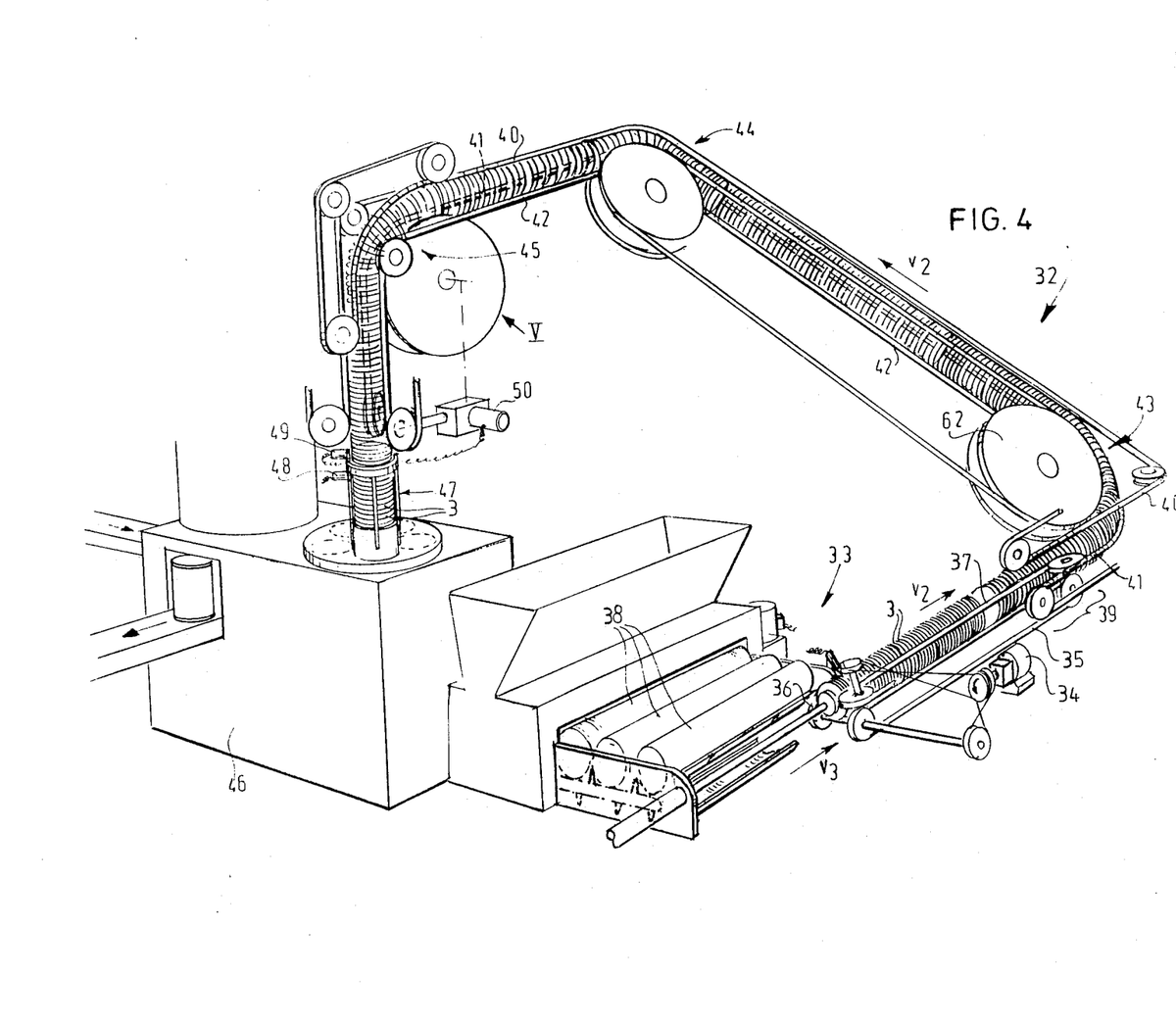

FIG. 4 shows a complex machine 32. It comprises a feeding device 33 for supplying stacks 38 of ends 3 to ropes 35, 36, 37 driven by a motor 34 with a speed $v_2$. These ends 3 are taken over via a transition zone 39 by three further transport ropes 40, 41, 42 after which the ends 3 are guided around a bend 43 by a guide disc 62.

Along two further bends 44, 45 the ends are guided further to a closing device 46, above which is located the magazine 47 for the ends 3, the contents of which are maintained between two extreme values by means of two monitors 48, 49. The latter control a motor 50, which drives the ropes 40, 41, 42 with a variable speed $v_1$.

Figure 5:
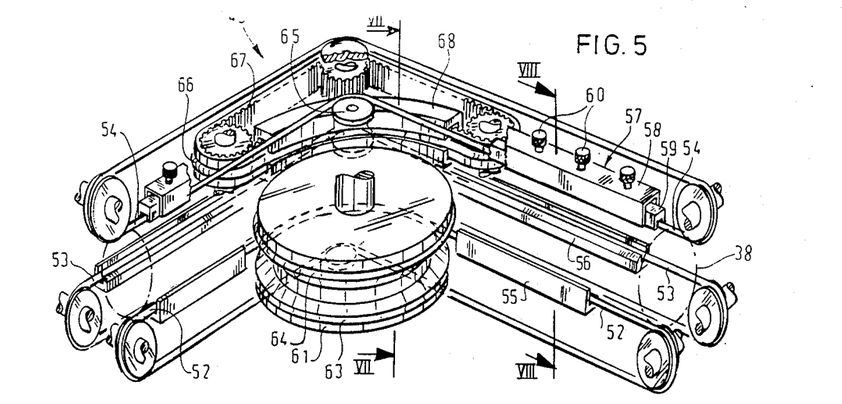

FIG. 5 shows in further detail the structure of the bend 45, which is similar to that of the bends 43 and 44.

It will be obvious that owing to the presence of a bend the angular speed of ropes being in different positions relative to the centre of rotation has a value such that transported ends 3 can be in an inclined position after having passed around the bend. In order to avoid this, the angular speed of the ropes in the bend must everywhere be the same, which implies that ropes lying further outwards should have a higher linear speed. Two lower ropes 52, 53 and an upper rope 54 transport covers 3 along the bend 45. The rope 52 is guided by its active part by a guide 55, the rope 53 by a guide 56 and the rope 54 by a guide 57 formed, as is shown more in detail in FIG. 8, by a U-shaped profile beam 58 in which is located a U-shaped beam 59 movable from and towards the transport space i.e. the space bounded by the active parts of the ropes 52, 53, 54. Setting of said beam can be carried out by means of screws 60. They may also be used for adjusting the spring pressure exerted by the rope 54 on the transported ends. It is noted here that the ropes 52, 53 shown in FIG. 5 have no freedom of movement so that it is necessary to use separate spring means for transporting the ends in a clamped state. The rope 52 is guided in the bend by a guide disc 61. The guide disc 61 has for this purpose on the underside a continuous groove 63. On the corresponding top side the guide disc 61 has a rope 64 formed by a fixed, circulating belt. In the zone in which the belt 64 transports the ends 3 in the bend 45 the rope 54 is put out of operation and guided straight on to follow the bend around a guide roller 65. Locally the effect of the rope 54 is taken over by a rope 66 arranged on a driven toothed belt 67.

Figures 6, 7, 8:
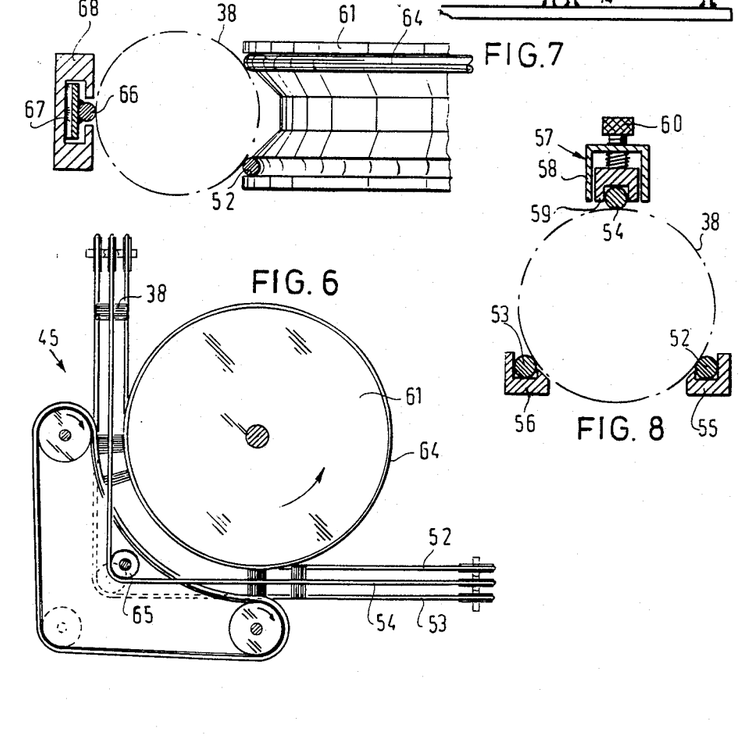

FIG. 6 shows the construction described in a plan view in which the take-over of the functions of the respective ropes is shown more clearly. From this Figure it appears how the toothed belt 67 is guided by its active part i.e. the part facing the guide disc 62 by an arcuate guide 68.

FIG. 8 shows the construction described with reference to FIG. 5 on the inlet side of the bend 45.

The stack supply device 91 of FIGS. 10 to 19 comprises as a variant of the stack supply device 89 three rollers 92, 93 and 94 forming guide means for a stack 4 of ends 3 and extending mainly in the axial direction of the set of ropes 211, 212, 213 of the front end of the transport device 210 of FIGS. 20 to 25. The stack supply device 91 has a stock holder 95 for stacks 4 of ends 3 packed in sheets, for example, of paper, a bottom of which slopes downwards to a chain conveyor 97 bounding the stock holder and having chains 103 passed around sprockets 102 and having transverse bars 98 and a guide plate 99.

Between the transverse bars 98 there are stack receiving spaces 100 so that when the chain conveyor 97 is driven in the direction of the arrow 101 a stack 4 of ends 3 is received in each space 100 and then supplied rolling along the guide plate 99 to an unpacking device 104, which comprises three rollers 92, 93 and 94. The roller 93 co-operates with a roller 107 as a pair for conducting away a sheet 108. The rubber-coated rollers 107 and 93 are driven by a motor 110 via a chain drive 109 so that the rollers 93 and 107 and also the rollers 92 and 94 indirectly driven via the stack 4 rotate in the direction indicated by arrows 111.

The unpacking device 104 comprises a knife holder 112, which is urged by means of a leaf spring 113 in the direction of the arrow 114 towards the stack 4 until a hard steel stop 115 fastened to the knife holder 112 strikes the stack 4 in order to hold a knife 116 of the knife holder 112 along the stack 4 so that the sheet 108 forming the packing is cut off the stack 4, however, without damaging the ends. The knife holder 112 is adjustably fastened to a frame 118 by means of set screws 117 and fastening bolts 120 lying in elongate holes 119. The stop 115 co-operating with the roller 93 to form a bulging part 143 in which the preferably milled knife 116 can start cutting.

Figure 25:
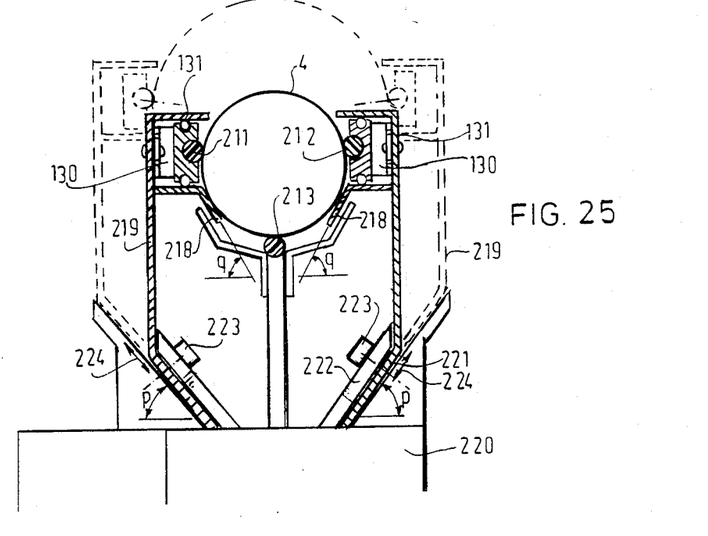

The rollers 92, 93 and 107 are rotatably journalled in the frame 121 comprising guide bars 122 for guiding a support 123 in the axial direction of ropes 211 to 213. An air cylinder 124 moves the support 123 in the direction of the arrow 125 to and fro. The support 123 has an arm 127 that can be turned by means of a cylinder 126 and that carries at the lower end a retaining support 128. The rope 213 is arranged centrally on the underside and the ropes 211 and 212 are arranged slightly above the middle of the stack 4 (see FIG. 23), so that the retaining support 128 can engage from above the stack 4 between the ropes 211 and 212. The ropes 211 and 212 are each guided in a rope guide 129, which is arranged with springs 130 in a U-profile. As shown in FIG. 25 these springs are leaf springs. Thus the stack 4 is stably enclosed between the ropes 211, 212 and 213.

In order to enhance the safety against falling over of the covers 3 the transport space between the ropes 211, 212, 213 is bounded on the underside by guide plates 218, which are outwardly and upwardly directed at an angle g of 60° to the horizon. When ends 3 of a different diameter are treated, the two ropes 211 and 212 are displaced by displacing the associated U-profiles 131 connected with brackets 219 by means of setting means with respect to a frame 220, for example, into the positions indicated by broken lines. The setting means comprise fastening plates 221 and 222 being at an angle p of preferably 48°30′ to the horizon and being mutually displaceable by means of bolts 223 lying in slots in the direction of the arrows 224.

The length of the rollers 92, 93, 94 is such that stacks 4 of great and different lengths can be processed. The pestle 132 is fastened to a support 133, which is reciprocated by means of a motor 134 driving a screw spindle 135 in the axial direction of the ropes 211 to 213. As an alternative the pestle 132 may be reciprocated by means of a pneumatic cylinder, preferably a known air cylinder, the piston of which has a fastening arm extending through a longitudinal slot of the cylinder, whilst means are provided for sealing the cylinder slot.

The control of the unpacking device 104 is illustrated in successive stages in FIGS. 12 to 19.

Figure 10:
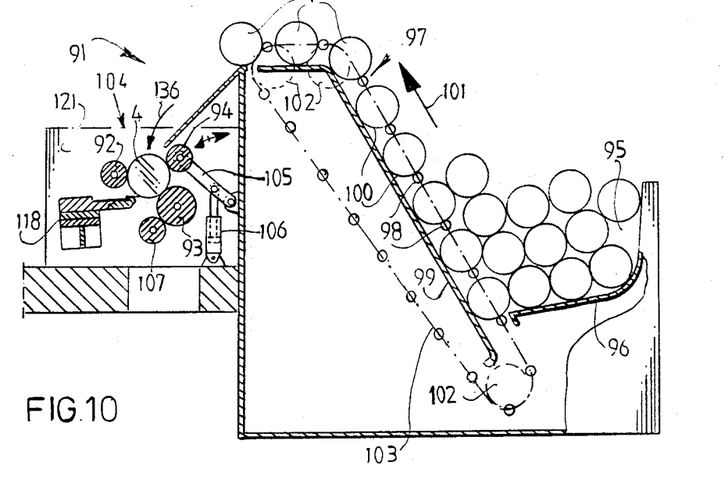
Figure 11:
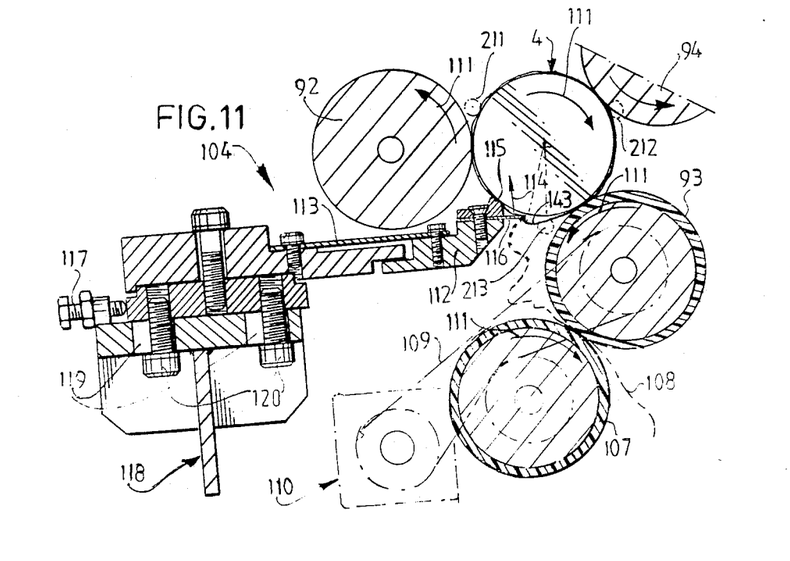
Figure 12:
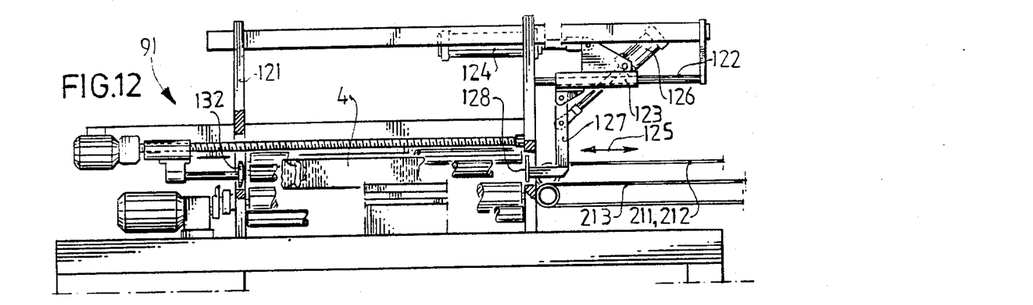
Figure 13:
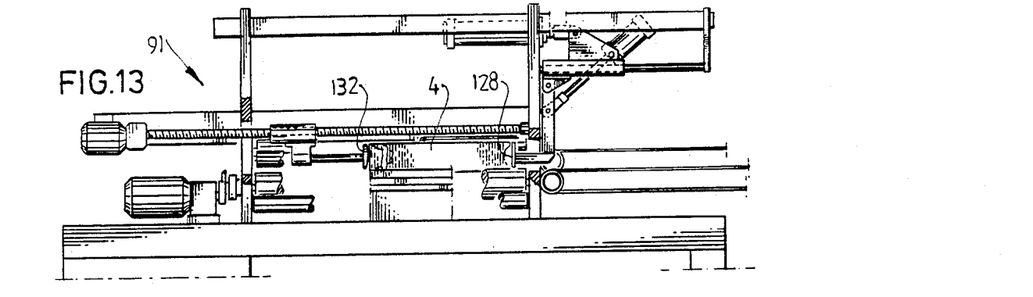
Figure 14:
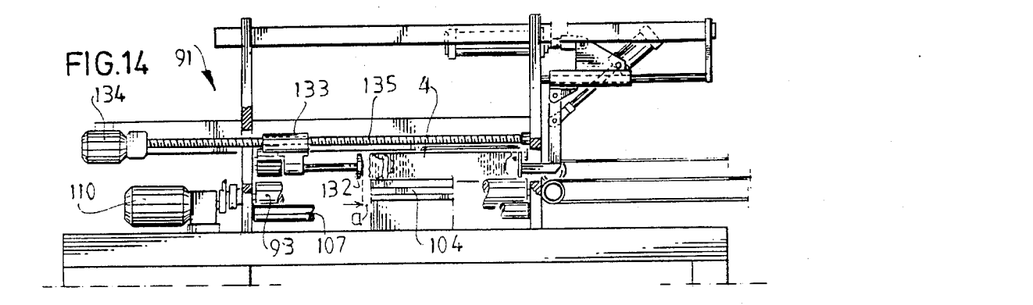

In the position shown in FIG. 12 the retaining support 128 and the pestle 132 are located at the two ends of the unpacking space and the roller 94 is in the deflected position indicated by broken lines in FIG. 10 so that a packed stack 4 can roll between the rollers 92, 93 and 94 in the direction of the arrow 136. The pestle 132 then moves into the position shown in FIG. 13 in which the packed stack 4 is urged against the retaining support 128, after which the pestle 132 is moved back over a small distance of, for example, 5 mms (FIG. 14) in order to leave some clearance at both ends of the stack 4 for releasing the sheet 108.

Figure 15:
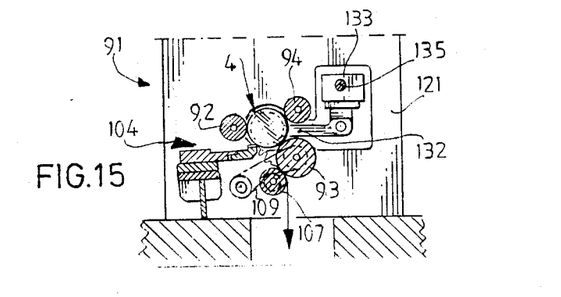

As shown in FIG. 15 the stack 4 is rotated by driving the rollers 92, 93 and 107, whilst the knife 116 cuts up the sheet 108 and peels it off the stack 4. The sheet 108 is conducted away between the rollers 93 and 107.

Figure 16:
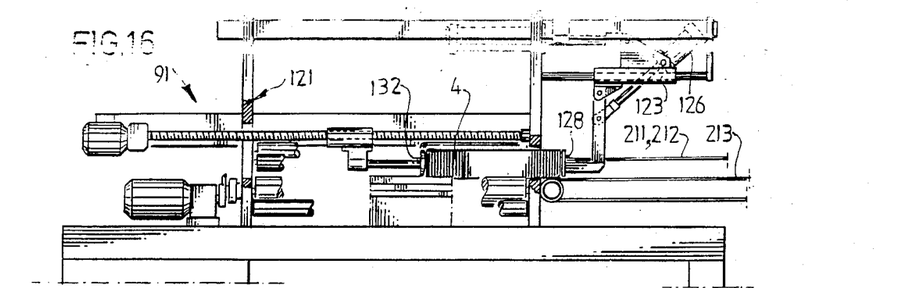
Figure 17:
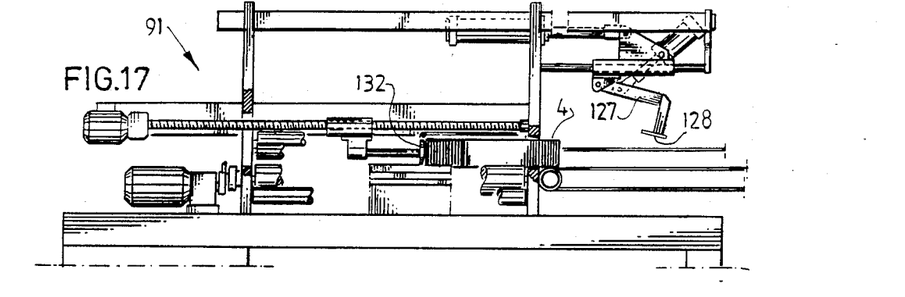

As shown in FIG. 16 the unpacked stack 4 is driven by the pestle 132 with the above mentioned speed $v_3$ which exceeds the speed $v_2$ of the ropes 211, 212, 213, the pestle pushing in front of it the retaining support 128 together with the support 123, whilst the stack 4 is clamped tight. The air cylinder 124 then operates as a counter-pressure spring. When the stack is engaged over a sufficient length between the ropes 211 to 213, so that these ropes produce sufficient counter-pressure, the retaining support 128 is turned away by means of the cylinder 126 from between the ropes (FIG. 17).

Figure 18:
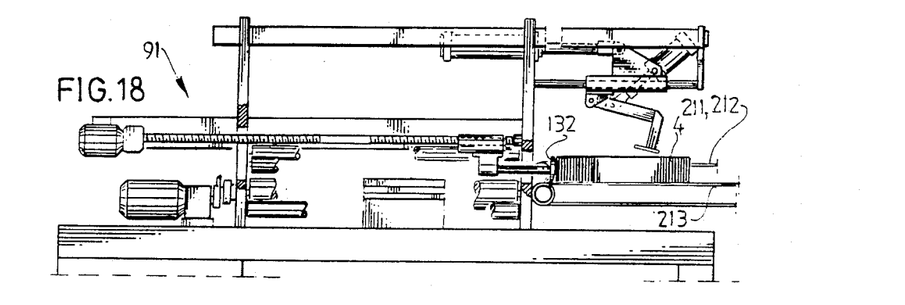
Figure 19:
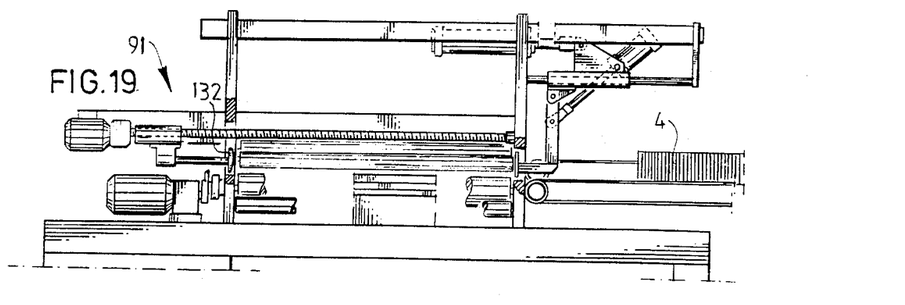

FIG. 18 shows that the whole stack 4 is located between the ropes 211 to 213. Then the pestle 132 and the retaining support 128 move back to their initial positions (FIG. 19), whilst the stack 4 is further transported by the ropes 211 to 213. Then a next packed stack 4 of FIG. 12 can drop in between the rollers.

Figures 22, 23, 24:
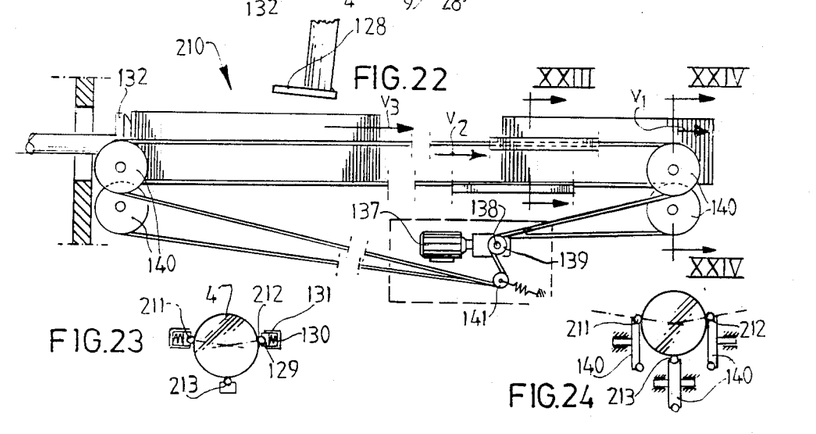

FIG. 22 shows that the ropes 211 to 213 can be commonly driven with the same speed $v_2$ by a motor 137 having pulleys 139 mounted on a common horizontal shaft 138. The ropes 211 to 213 are all positioned in a vertical plane and passed along guide discs 140 and stretching discs 141.

We claim:

1. The method of handling round flat substantially identical ends for tins comprising providing a plurality of elongated stacks of ends of at least a predetermined length, each stack comprising a plurality of separate ends in abutting relationship, supplying said stacks at intervals of time to a first conveying means where the ends are resiliently gripped to hold the ends of each stack in abutting relationship with one another and spaced from the preceding stack supplied to the first conveying means, moving each stack of ends linearly by the first conveying means in the direction of elongation of the stack at a first speed to a second conveying means where each stack of ends is further resiliently gripped to hold the ends of each stack in abtting relationship with one another, moving each stack of ends linearly by the second conveying means in the direction of elongation of the stacks at a second speed which is less than the first speed, the stacks of ends being supplied to the first conveying means in intervals short enough to ensure that the foremost end of each subsequent stack of ends is brought into abutting contact with the rearmost end of the preceding stack while the preceding stack is at least partially gripped by the first conveying means to ensure that a continuous stack of ends is provided downstream of the first conveying means.

2. The method as defined in claim 1 wherein each stack of ends is supplied to the first conveyer means linearly in the direction of elongation of the stack at a third speed which is greater than said first speed.

3. Apparatus for handling round flat substantially identical ends for tins comprising stack supply means for supplying a plurality of elongated stacks of ends of predetermined length, each stack comprising a plurality of separate ends in abutting relationship, first and second conveying means, said stack supply means supplying stacks of ends to said first conveying means at intervals of time, each of said conveying means comprising at least three endless belts spaced so as to resiliently grip and hold the ends of each stack in abutting relationship to one another and for moving each stack of ends linearly in the direction of elongation of the stack, driving means for driving the first conveying means at a first linear speed, driving means for driving the second conveying means at a second linear speed which is less than the first linear speed, the upstream portion of said second conveying means overlapping the downstream portion of said first conveying means so that an associated stack of ends is simultaneously gripped by said upstream and downstream portions, and means for operating said stack supply means in intervals short enough to ensure that the foremost end of each subsequent stack of ends is brought into abutting contact with the rearmost end of the preceding stack while the preceding stack is at least partially gripped by the first conveying means to ensure that a continuous stack of ends is provided downstream of the first conveying means.

4. Apparatus as defined in claim 3 wherein said stack supply means is operated to supply each of said stacks linearly in the direction of elongation of the stack at a third speed which is greater than said first speed.

5. Apparatus as defined in claim 3 wherein said stack supply means includes guide means for guiding linear movement of a stack of ends to said first conveying means, and pestle means mounted for reciprocation in a linear direction and engageable with each stack of ends for supplying each stack of ends to the first conveying means.

6. Apparatus as defined in claim 5 wherein said stack supply means includes a retaining support mounted for reciprocation in a linear direction, said pestle means and said retaining support being adapted to clamp a stack of ends therebetween.

7. Apparatus as defined in claim 6 wherein said retaining support is movable into and out of the path of linear movement of each stack of ends.

8. Apparatus as defined in claim 3 including guide plate means disposed adjacent said first conveying means and defining upwardly and outwardly sloping guide plates to ensure that the ends of a stack do not fall over.

9. Apparatus as defined in claim 3 wherein said first conveying means includes a lower centrally located belt and two upper belts disposed laterally on eiter side of the lower belt, the upper belts being disposed along the circumference of a circle at a circumferential angle of less than 180°.

10. Apparatus as defined in claim 9 wherein said angle is about 166°.

11. Apparatus as defined in claim 9 including setting means for displacing said upper belts in an upward and outward direction at an angle between about 40° to 50° with respect to horizontal.

12. Apparatus as defined in claim 11 wherein said angle is about 48° 30'.

13. Apparatus as defined in claim 9 including resilient means urging at least one of said belts toward an associated stack of ends.

14. Apparatus for handling round flat substantially identical ends for tins comprising a stack supply means for supplying a plurality of elongated stacks of ends of predetermined length, each stack comprising a plurality of separate ends in abutting face-to-face relationship, conveying means for receiving spaced stacks of ends from said stack supply means at intervals of time and for conveying ends along a linear path in the direction of the longitudinal axis of each stack away from said stack supply means, said stack supply means including pestle means and retaining support means for clamping a stack of ends therebetween, said pestle means and said retaining support means being movable in unison along the path in a linear direction toward said conveying means with a stack of ends clamped therebetween, said pestle means being movable in a linear direction away from said conveying means independently of the movement of said retaining support means, and means for moving said retaining support means into and out of the path of linear movement of each stack of ends while said pestle means engages the stack in said linear direction to move the stack onto the conveying means.

15. Apparatus for handling round flat substantially identical ends for tins comprising a stack supply means for supplying a plurality of elongated stacks of ends of predetermined length, each stack comprising a plurality of separate ends in abutting face-to-face relationship, conveying means for receiving spaced stacks of ends from said stack supply means at intervals of time and for conveying ends along a linear path in the direction of the longitudinal axis of each stack away from said stack supply means, said stack supply means including pestle means and retaining support means for receiving a stack of ends from a lateral supply means and clamping a stack of ends therebetween, said pestle means and said retaining support means being movable in unison along the path in a linear direction toward said conveying means with a stack of ends clamped therebetween, the pestle means being movable in a linear direction away from said conveying means independently of the movement of said retaining support means and then being movable to engage the stack in said linear direction to move the stack onto the conveying means.

16. Apparatus as defined in claim 14 including unpacking means for removing a surrounding sheet of material from each stack of ends, said unpacking means being disposed adjacent said stack supply means and comprising cutting means for cutting a sheet surrounding a stack of ends.

17. Apparatus as defined in claim 16 including means for resiliently biasing said cutting means into an operative cutting position.

18. Apparatus as defined in claim 16 including means for rotating each stack of ends about the axis of elongation thereof.

19. Apparatus as defined in claim 18 including stop means bearing on the sheet surrounding each stack disposed in said unpacking means to retard movement of the sheet in the direction of rotation to create a bulge engageable by said cutting means.

20. Apparatus as defined in claim 16 including roller means for engaging a sheet after it has been cut and conducting such sheet away from the unpacking means.

21. Apparatus as defined in claim 14 including unpacking means for removing a surrounding sheet of material from each stack of ends, said unpacking means being disposed adjacent said stack supply means and comprising cutting means for cutting a sheet surrounding a stack of ends.

22. Apparatus as defined in claim 21 including means for resiliently biasing said cutting means into an operative cutting position.

23. Apparatus as defined in claim 21 including means for rotating each stack of ends about the axis of elongation thereof.

24. Apparatus as defined in claim 23 including stop means bearing on the sheet surrounding each stack disposed in said unpacking means to retard movement of the sheet in the direction of rotation to create a bulge engageable by said cutting means.

25. Apparatus as defined in claim 21 including roller means for engaging a sheet after it has been cut and conducting such sheet away from the unpacking means.

26. Apparatus as defined in claim 3 including magazine means receiving stacked ends from said second conveying means, monitoring means for determining the number of ends in said magazine means, said monitoring means controlling the speed of said second conveying means, and a closing means receiving ends from said magazine means for attaching each of said ends to a tin.

27. Apparatus as defined in claim 14 including stack feed means having stack holder means and a transport means defining spaces therein for receiving stacks of ends from said stack holder means, said stack feed means providing stacks of ends in a lateral direction to said stack supply means.

28. Apparatus as defined in claim 27 including unpacking means for removing a surrounding sheet of material from each stack of ends, said unpacking means being disposed adjacent said stack supply means and comprising cutting means for cutting a sheet surrounding a stack of ends, and means for resiliently biasing said cutting means into operative cutting position.

29. The method of handling round flat substantially identical ends for tins comprising providing a plurality of elongated stacks of ends wherein each stack comprises a plurality of separate ends in abutting relationship and surrounded by a sheet of material, moving each individual stack of ends laterally of its direction of elongation into an unpacking space, providing a substantially stationary cutting means, rotating each stack in the unpacking space in a predetermined direction about its direction of elongation to contact said cutting means to cut the sheet of material and peeling the sheet of material from each stack while the stack is rotating in the unpacking station, displacing the peeled sheet away from each stack while continuing to rotate the stack and then removing each stack from the unpacking space linearly in the direction of elongation of the stack.

30. Apparatus for handling round flat substantially identical ends for tins comprising rotatable roller means defining an unpacking space for receiving elongated stacks of at least a predetermined length wherein each stack comprises a plurality of separate ends in abutting relationship to one another and surrounded by a sheet of material, feed means for moving individual stacks of ends laterally of the direction of elongation thereof into said unpacking space, said roller means being engageable with each of said stacks, means for rotating said roller means for rotating an engaged stack in the unpacking space in a predetermined direction about its axis of elongation, unpacking means including a substantially stationary cutting means for cutting the sheet of material and peeling the sheet of material from a stack while the stack is rotating, said roller means including a pair of rollers engageable with a peeled sheet of material for displacing the sheet of material between said pair of rollers and away from each stack, and means for removing each stack from the unpacking space linearly in the direction of elongation of the stack.

31. Apparatus as defined in claim 30 wherein said unpacking means comprises knife means and means resiliently biasing said knife means into an operative cutting position.

32. The method of attaching ends to tins comprising providing a plurality of elongated stacks of ends wherein each stack comprises a plurality of separate ends in abutting relationship to one another and surrounded by a sheet of material, moving each individual stack of ends into an unpacking space, rotating each stack in the unpacking space about its direction of elongation, cutting the sheet of material and peeling the sheet of material from each stack while the stack is rotating, removing each stack from the unpacking space and supplying each stack at intervals of time to conveying means where the ends are gripped to hold the ends of each stack in abutting relationship with one another and spaced from the preceding stack supplied to the conveying means, moving each stack of ends by the first conveying means such that each stack of ends is brought into contact with the preceding stack to form a continuous stack of ends, conveying said continuous stack of ends to a closing means and attaching the individual ends to the open ends of individual tins to close the tins.

33. Apparatus for attaching round flat substantially identical ends to tins comprising rotatable roller means defining an unpacking space for receiving elongated stacks of ends of predetermined length wherein each stack comprises a plurality of separate ends in abutting relationship and surrounded by a sheet of material, feed means for moving individual stacks of ends into said unpacking space, means for rotating said roller means and an associated stack for rotating each stack in the unpacking space about its direction of elongation, unpacking means for cutting the sheet of material and peeling the sheet of material from a stack while the stack is rotating, stack supply means for removing each stack from the unpacking space, conveying means, said stack supply means supplying each stack to said conveying means at intervals of time with the ends in abutting relationship with one another and spaced from the preceding stack supplied to the conveying means, said conveying means including two portions moving at different speeds to cause each stack of ends to be brought into contact with a preceding stack to form a continuous stack of ends, and closing means for attaching individual ends to the open ends of individual tins to close the tins, said conveying means conveying said continuous stack of ends to said closing means.

* * * * *